March 13, 1928.  
C. B. KINGSLEY  
1,662,116  
METHOD OF AND APPARATUS FOR PRODUCING MOLTEN GLASS  
Filed March 5, 1927
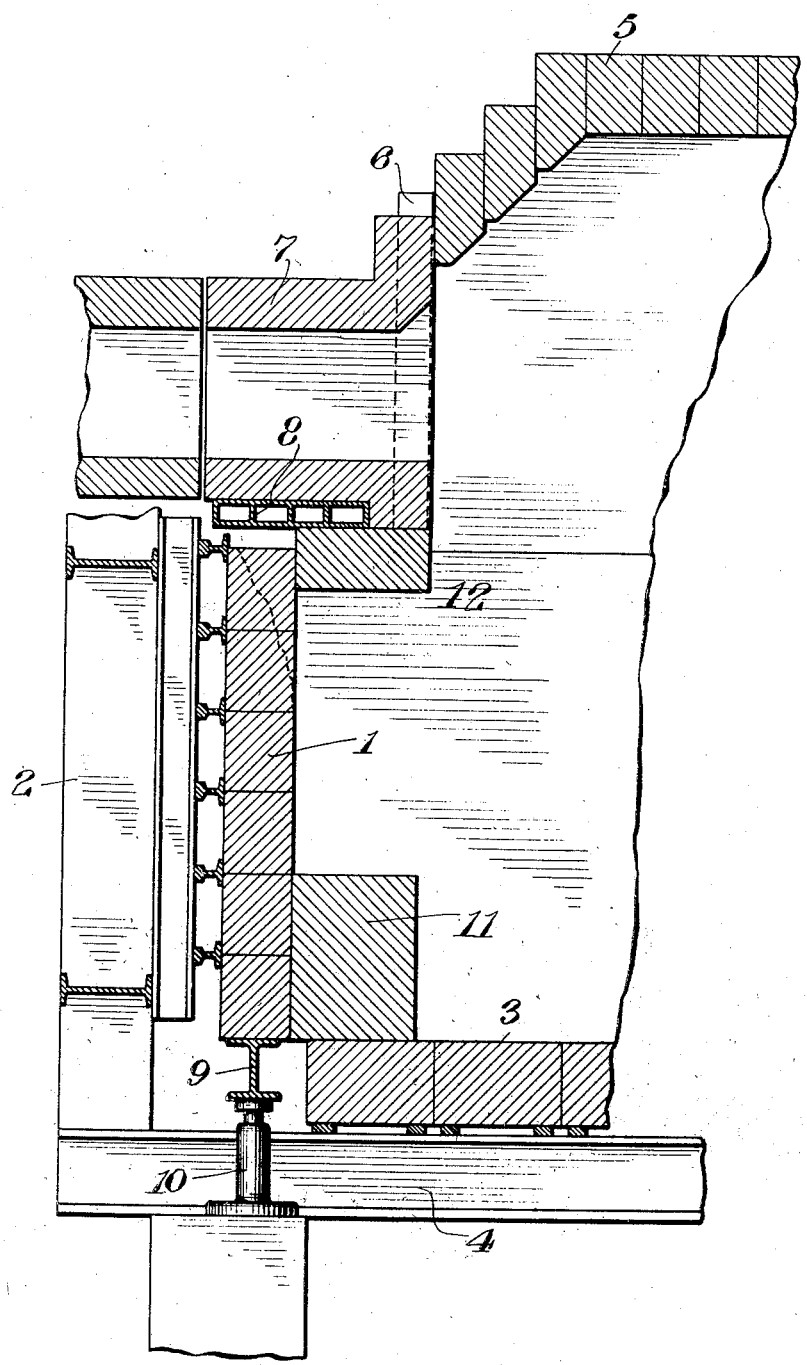

Patented Mar. 13, 1928.

1,662,116

UNITED STATES PATENT OFFICE.

CHARLES B. KINGSLEY, OF CLAIRTON, PENNSYLVANIA, ASSIGNOR TO MISSISSIPPI GLASS COMPANY, A CORPORATION OF NEW YORK.

METHOD OF AND APPARATUS FOR PRODUCING MOLTEN GLASS.

Application filed March 5, 1927. Serial No. 173,012.

The present invention relates to method of and apparatus for producing molten glass.

The invention comprises new and novel methods of operation of glass melting apparatus and new and novel constructions of glass melting apparatus hereinafter described and more particularly set forth in the claims.

In the accompanying drawing I have shown for purposes of illustration a vertical section of a form of apparatus for producing molten glass according to my new methods.

In the drawings, the apparatus comprises the usual confining walls for molten metal, consisting of side wall blocks or tiles 1, and supporting braces 2, therefor and bottom blocks 3 resting on I-beams 4. Above the top of side wall 1 is a suspended structure consisting of crown blocks 5, brought down at the ends thereof to join breast wall blocks 6, also suspended from above and gas ports 7 mounted on water cooled plates 8 and adapted to be lowered and raised into and out of place in the breast wall for repair and replacement while the furnace is being operated.

The side walls 1 are supported on I-beams, 9, resting on jacks, one of which is shown at 10, and the side walls 1 are made up of contiguous sections each of suitable length on the four sides of the tank.

A course of blocks 11, is laid around the bottom of the tank and against the bottom blocks of the side wall and a course of blocks 12 floating in the molten metal in the tank closes off the space between the bottom of the breast wall 6 and the ports 7 and the top of the wall 1.

The side wall blocks of glass melting furnaces are eroded more quickly at the top than they are lower down and heretofore it has been necessary to shut the furnace down to make repairs, but with a furnace constructed as above shut downs are avoided and continuous operation of the furnace is secured in view of the fact that when the top course of the wall 1 is eaten away sufficiently to require replacement, say in a section under one of the gas ports 7, the section of the wall 1 under the gas port is braced up from below, the I beam 9 lowered on the jacks 10, and a new course of block laid in the space between the bottom of wall 1 and the top of I beam 9, the gas port 7 and its water cooled plate 8 are raised up and out of the way, and the jacks 10 operated to raise the wall 1 upwardly until the second course of blocks of the section is in line with the top of adjacent portions of side wall 1 at which time, the eroded top blocks can be removed, new blocks 12 substituted, if desired, and the port members 7 and 8 lowered back into place above wall 1.

What I claim is:

1. The method of operating a glass melting apparatus comprising confining molten glass within tank walls, laying a new course of block under a wall section, and raising the new and old portions of said section to displace the top course of the old section in said side wall.

2. A glass melting furnace, comprising side and bottom walls for confining molten metal therein, movable means for supporting the side walls in sections and at the bottom thereof, and means for lowering one of said supporting means to receive a new wall portion and to raise the old and new wall portions into place in said side wall.

In testimony whereof I hereto affix my signature.

CHARLES B. KINGSLEY.